(No Model.)
C. WHITEHEAD.
COMPOUND OF MAGNESIUM, CALCIUM, AND CARBID.
No. 555,796. Patented Mar. 3, 1896.
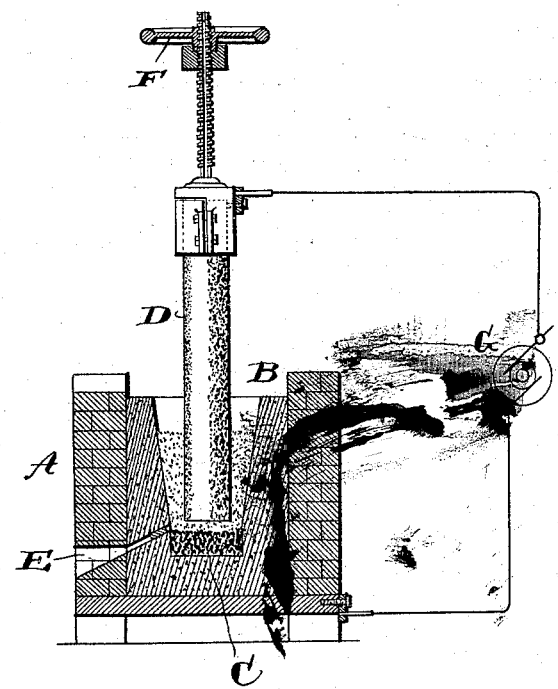

UNITED STATES PATENT OFFICE.

CABELL WHITEHEAD, OF WASHINGTON, DISTRICT OF COLUMBIA, ASSIGNOR OF TWO-THIRDS TO ROBERT E. PRESTON, OF SAME PLACE, AND THEODORE G. SPRINGER, OF CHICAGO, ILLINOIS.

COMPOUND OF MAGNESIUM, CALCIUM, AND CARBID.

SPECIFICATION forming part of Letters Patent No. 555,796, dated March 3, 1896.

Application filed December 30, 1895. Serial No. 573,841. (No specimens.)

*To all whom it may concern:*

Be it known that I, CABELL WHITEHEAD, a citizen of the United States, residing at Washington, in the District of Columbia, have invented certain new and useful Improvements in a Compound of Magnesium, Calcium, and Carbon; and I do hereby declare the following to be a full, clear, and exact description of the invention, such as will enable others skilled in the art to which it appertains to make and use the same.

My invention relates to a new and useful compound of carbon, magnesium, and calcium; and it consists in the novel features hereinafter described, the said invention being fully disclosed in the following description and claims.

In the accompanying drawing I have shown a sectional view of one form of electric furnace which is advantageously employed in carrying out my invention.

At the present time calcium carbide alone is used commercially for the production of acetylene gas. Each ton of this material produces only seven hundred and nineteen pounds of acetylene. The new compound of carbon and magnesium which is the subject of this invention, and which exists in the form of a double carbide of magnesium and calcium, will produce a large percentage more of acetylene, while the cost of production is substantially the same.

In order to produce my new compound, I take an ore of magnesium and calcium, preferably a carbonate such as the mineral dolomite, which is the double carbonate of calcium and magnesium, and calcine the same in any usual manner, thereby driving off the carbonic-acid gas, and leaving the double oxide of calcium and magnesium. I then mix with the double oxide a quantity of finely-comminuted carbon. The proportion of carbon to be employed depends upon the amount of magnesium in the dolomite which is used. The mixture is reduced preferably to the condition of a powder and the carbon is thoroughly mixed with the double oxide. The mixture is then raised to a sufficient temperature to cause the combination of the oxides and carbon, thereby producing a double carbide of calcium and magnesium. I find it convenient to employ an electro furnace for this purpose, and I preferably subject the mixture to the action of an electric current from either an alternating or direct current dynamo of about sixty volts potential, the amperage depending upon the size of the furnace used.

In the accompanying drawing I have shown an electric furnace which is conveniently employed for this purpose.

In said drawing, A represents the exterior brickwork of the furnace, within which is placed the crucible B or lining, preferably of carbon. C represents one of the conducting-poles, which is in this instance broken carbon; D, a removable pole consisting of a rod of compact carbon.

E represents the top hole of the furnace.

F represents mechanism for adjusting the pole D vertically, and G indicates the dynamo, which may be of any desired form and is connected electrically with the two poles of the furnace. I do not, however, limit myself to the use of this form of electric furnace.

What I claim, and desire to secure by Letters Patent, is—

1. The double carbide of magnesium and calcium, substantially as described.

2. The double carbide of magnesium and calcium in crystalline form, substantially as described.

In testimony whereof I affix my signature in presence of two witnesses.

CABELL WHITEHEAD.

Witnesses:
L. P. WHITAKER,
J. D. KINGSBERY.